United States Patent [19]

Padget et al.

[11] Patent Number: 4,925,893

[45] Date of Patent: May 15, 1990

[54] CURABLE COATING COMPOSITIONS AND THEIR PREPARATION AND USE

[75] Inventors: John C. Padget, Frodsham; Stephen G. Yeates, MacClesfield; Mary R. R. Marsh, Warrington, all of England

[73] Assignee: Imperial Chemical Industries PLC, London, England

[21] Appl. No.: 214,127

[22] Filed: Jun. 30, 1988

[30] Foreign Application Priority Data

Jun. 30, 1987 [GB] United Kingdom ............... 8715309
Aug. 7, 1987 [GB] United Kingdom ............... 8718729

[51] Int. Cl.$^5$ ............................................. C08K 5/13
[52] U.S. Cl. .................................. 524/337; 524/568; 524/833
[58] Field of Search ................... 524/833, 377, 568

[56] References Cited

U.S. PATENT DOCUMENTS 4,296,013 10/1981 Gibbs .............................. 524/833
4,346,027 8/1982 Van Eenam ................... 524/377

Primary Examiner—Joseph L. Schofer
Assistant Examiner—Mark D. Sweet
Attorney, Agent, or Firm—Cushman, Darby & Cushman

[57] ABSTRACT

Aqueous-based, film-forming and ambient-temperature autoxidisably crosslinkable coating composition comprising an aqueous latex of a film-forming copolymer having residual unsaturation for autoxidative cross-linking puuposes, an autoxidation catalyst, preferably a drier salt, and optionally a multi-functional crosslinking material, wherein the copolymer has a gel fraction of at least 5% by weight which has been formed by the early addition of a multi-functional comonomer in the copolymerization, with a low reactivity multi-functional comonomer being added late in the copolymerization to provide the residual unsaturation.

13 Claims, No Drawings

CURABLE COATING COMPOSITIONS AND THEIR PREPARATION AND USE

The present invention relates to aqueous-based, film-forming and ambient-temperature autoxidisably crosslinkable coating compositions, and to their preparation and use.

Aqueous-based coating compositions based on aqueous latices of film-forming polymers are well known and in wide use, the polymer latices usually being provided by aqueous emulsion polymerisation of monoethylenically unsaturated monomers. It is also known to improve the properties of coatings formed from such latices by providing a cure capacity in the composition whereby the deposited polymer coating can be crosslinked after application to the substrate being coated. Such a cure capacity can be achieved, for example, by the addition of a crosslinking agent to the composition or by rendering the coating composition self-crosslinkable by appropriate adjustment of the polymer composition. The curing step in such systems has usually been effected by heating at an elevated temperature (baking) but this has largely limited curable coatings to industrial situations where baking capacity is available and where a baking operation is feasible (e.g. as when coating reasonably small articles). There has therefore been a need for a low (e.g. ambient) temperature cure capacity in such systems. Some methods to achieve this objective have employed the use of toxic materials such as polyaziridenes. However a non-toxic approach to this problem would undoubtedly be more desirable. In this respect, the use of autoxidisable polymers would in principle be ideal, and such a technique has been widely used for solvent-borne systems (e.g. Alkyds) but not for water-based systems to any extent because of certain disadvantages that have been found in such systems.

Autoxidisable polymers, that is polymers which will crosslink on exposure to oxygen, have been known for many years and have been used extensively in the surface coatings industry. The autoxidisable species which have almost universally been used are the long chain unsaturated fatty acids derived from naturally-occurring triglyceride drying oils; there are other autoxidisable species such as vinyl dioxolane, dicyclopentadiene, certain poly(butadienes) and certain allyl group-containing entities, but the drying oil-derived species have hitherto remained the most widely used.

A goal long pursued by the surface coatings industry is the water-borne autoxidisable coating. There have been many attempts to achieve this. One typical approach has been to prepare a high acid value alkyd resin which can then be water solubilised by means of a base. However this system is prone to a slow rate of drying, yellowing tendencies and odour problems, and it has never realised its initial promise. A more recent method is proposed in U.S. Pat. Nos. 4,244,850 and 4,289,675. These two patents refer, in their prior art discussions, to the known technique of achieving cure capacity by including a multi-functional comonomer in the monomer system used to prepare the polymer, thereby to provide residual unsaturation in the polymer for crosslinking purposes. The US patents point out, however, in respect of this technique, that it is difficult to avoid premature consumption of all of the unsaturation which it is intended to preserve for ultimate cure (crosslinking); this, it is said, impairs the capacity of the latex polymer particles to coalesce into a properly uniform and adherent film. In these two U.S. patents there are then described and claimed certain air-drying polymer latex coating compositions which are curable under ambient conditions and which avoid the drawback of premature crosslinking. The essential features of these claimed compositions are: (1) a copolymer latex formed by copolymerising a "reactive" comonomer (as defined therein) by which is meant a comonomer having a reactive functionality (such as carboxyl, 1,2 epoxy, or C1 to C6 N-alkylol) in addition to monoethylenic unsaturation, with a comonomer having monoethylenic unsaturation only (i.e. with no such reactive functionality) followed by reaction in the resulting polymer latex with a further reactive monomer having monoethylenic unsaturation and also a complementary reactive functionality for reaction with the reactive functionality now incorporated into the latex polymer particles, thereby to form a copolymer latex with copolymer particles having residual unsaturation; and (2) an autoxidation catalyst, particularly a "drier salt" (this term will be explained in more detail hereinafter). Nevertheless, such a process, even if it does overcome the problem of premature crosslinking, entails the further reaction of the copolymer particles once formed in order to provide the required residual unsaturation (thereby adding time and cost to the process). Additionally, the technique would not appear to be entirely free from the danger of premature crosslinking since a free radical polymerisation inhibitor (such as hydroquinone) is incorporated with the second-added reactive monomer in the Examples of the two U.S. patents.

We have now discovered aqueous-based film-forming coating compositions comprising certain copolymer latices which can be autoxidisably cured at ambient temperatures after application to a substrate via residual unsaturation in the copolymer molecules, wherein the copolymer latices are not prepared using a further separate reaction of the copolymer particles once formed (as required in U.S. Pat. Nos. 4,244,850 and 4,289,675). Moreover, the new compositions give rise to a rapid build-up of mechanical properties and solvent resistance without incurring the problem of impaired particle coalesce when films are formed from the compositions (the problem sought to be overcome by the teaching of the two U.S. patents).

According to the present invention there is provided an aqueous-based, film-forming and ambient-temperature autoxidisably crosslinkable coating composition comprising an aqueous latex of at least one film-forming and ambient-temperature autoxidisably crosslinkable copolymer formed by addition polymerisation, and an autoxidation catalyst(s) incorporated into said composition for effecting ambient temperature autoxidation of said at least one copolymer after application of the coating composition as a coating layer, wherein said film-forming copolymer has a gel fraction of at least 5% by weight which has been formed from the monomer system used to prepare said film-forming copolymer as a result of the inclusion therein of at least one multi-functional comonomer which has been added to the copolymerisation reaction in at least an early part thereof, and wherein said at least one film-forming addition copolymer is autoxidisably crosslinkable (having residual carbon carbon double bond unsaturation therein susceptible to an autoxidation reaction) as a result of said monomer system including at least one lower reactivity multi-functional comonomer providing an autoxidation capacity which has been added to the copolymerisation reaction in at least a late part thereof.

It has thus been discovered that the film-forming copolymer employed in the composition of the invention, which has at least 5% by weight of gel (i.e. crosslinked material) which has been formed in an early part of the copolymerisation as defined and in addition has residual unsaturation (susceptible to autoxidation) which has been formed in a late part of the polymerisation as defined, gives rise to a more rapid and complete development of the properties associated with crosslinking by autoxidation (i.e. improved mechanical properties and solvent resistance) in comparison to an autoxidisable copolymer without such a gel fraction as defined; nor does such a copolymer (containing gel) result in impaired particle coalescence when films are formed from a composition containing it. Moreover, such a copolymer is prepared using but a single polymerisation process.

The autoxidation catalyst(s) in the composition of the invention effects a curing reaction in the air-dried film after the composition has been applied to a substrate, this reaction being an autoxidation reaction whereby the residual unsaturation in the film-forming copolymer (residual carbon-carbon double bond unsaturation susceptible to autoxidation as defined) undergoes spontaneous induced oxidation by atmospheric oxygen (probably via a free-radical mechanism) to provide a crosslinked coating layer.

The preferred autoxidation catalysts are "drier salts" which are well known to the art for effecting air-curing in unsaturated film-forming substances. Generally speaking, drier salts are metallic soaps, that is salts of metals and long chain carboxylic acids. It is thought that the metallic ions effect the curing action in the film coating and the fatty acid components confer compatibility in the coating medium. The most important drier metals are cobalt, manganese, zirconium, lead and calcium. Of lesser importance are those based on barium, cerium, iron, vanadium and zinc. Drier salts are sometimes classified into two groups, the primary drier salts and the auxiliary drier salts according to their action in ambient cure autoxidative coatings. The primary drier salts are the most powerful and can be used on their own; examples of metals in this group are cobalt, manganese and vanadium. An explanation proposed for their high activity is that they are powerful oxidation catalysts and are also capable of accelerating the decomposition of peroxides or hydroperoxides (resulting from oxygen attack) into free radicals. In contrast, the auxilliary drier salts give only a feeble curing action if used alone, but when used in combination with a primary drier salt can give improved curing properties; examples of such drier salts are those based on barium, calcium, zirconium and zinc. Of the primary drier salts, those based on cobalt are often the most effective—and are often used in combination with an auxilliary drier salt(s) such as a zirconium-based drier salt and/or a calcium based drier salt (both of which are non-toxic). The level of drier salt(s) in the composition is typically that to provide an amount of metal(s) within the range of from 0.02 to 0.5% by weight based on the weight of crosslinkable copolymer.

Drier salts are conventionally supplied as solutions in white spirit for use in solvent-borne alkyd systems. They may, however, be used quite satisfactorily in autoxidisable aqueous-based coating compositions since they can normally be dispersed in such systems fairly easily. Chelated drier salts (J. Water Borne Coatings; Nov. 3, 1985) and multi-metallic drier salt complexes (U.S. Pat. No. 4,311,625) have been specifically developed for water-borne alkyd systems where high levels of base are generally added to the composition. These modified drier salts may also be used in the compositions of the present invention.

The gel fraction of said at least one film-forming copolymer in the composition of the invention is usually within the range 5 to 99% by weight, more preferably 20 to 90% by weight and particularly 50 to 80% by weight.

There is also provided according to the present invention a process for the preparation of an aqueous-based, film-forming and ambient-temperature autoxidisably crosslinkable coating composition as defined above, which process comprises:

(1) forming an aqueous latex of at least one film-forming, ambient-temperature autoxidisably crosslinkable copolymer made by addition polymerisation using a monomer system which yields a film-forming copolymer and includes at least one multi-functional comonomer which is added to the polymerisation reaction in at least an early part thereof thereby providing in the resulting copolymer a gel fraction having a proportion by weight of the copolymer as defined above and which also includes at least one lower reactivity multi-functional comonomer which is added in at least a late part of the polymerisation reaction thereby providing in the resulting copolymer residual unsaturated carbon-carbon double bonds (susceptible to autoxidation) which impart crosslinkability thereto; and (2) admixing said aqueous latex with an autoxidation catalyst(s) said autoxidation catalyst(s) preferably being a drier salt or a mixture of two or more drier salts.

By the term "multi-functional" in respect of said multi-functional comonomer is meant a comonomer having at least two unsaturated carbon-carbon double bonds which can each (i.e. separately) take part in a free-radical initiated addition copolymerisation reaction.

It is evident that by the term "monomer system" is meant a system which in terms of the nature of the comonomers therein and their mode of incorporation into the copolymer (quantity and/or timing of addition to the polymerisation medium) yields the copolymer as defined above (i.e. film-forming, with a gel fraction of at least 5%, and autoxidisably crosslinkable at ambient temperature by virtue of residual, i.e. free, carbon-carbon unsaturated double bonds susceptible to autoxidation) and which therefore includes (i) at least one comonomer which will provide the basis of the film-formability of the resulting copolymer and (ii) at least one multi-functional comonomer which in terms of its (or their) nature and/or mode of incorporation into the copolymer yields a copolymer having:
a gel fraction as defined above (by virtue of crosslinking during the early part of the polymerisation);
residual carbon-carbon double bond unsaturation which renders the resulting copolymer crosslinkable by an autoxidation reaction.

To achieve such residual unsaturation (for autoxidative crosslinking purposes) a multi-functional comonomer used (as defined) in the copolymerisation should have at least one of its carbon-carbon double bonds (in a molecule thereof) of a reactivity such that it or they react(s) in the copolymerisation at a significantly slower rate than does the unsaturated bond(s) of the comonomer(s) providing the main film-forming basis of the resulting copolymer (the "film-forming" comonomer(s)) and also such that it or they are susceptible to an autoxidation crosslinking reaction in a subsequently formed coating film. (Such a multi-functional comonomer is herein termed a lower reactivity multi-functional comonomer for convenience). This does not preclude two or more (or all) of the unsaturated double bonds of a lower reactivity multi-functional comonomer being less reactive in this way. Preferably, the lower reactivity multi-functional comonomer is an allyl or allyloxy-type material which contains one or more allyl or allyloxy groups, or substituted allyl or allyloxy groups, such groups being represented by the formula $CH_2=CRCH_2(O)_x-$ where R is hydrogen or a lower (C1 to C4) alkyl group, e.g. methyl or ethyl, and x is 0 or 1.

By the "gel fraction" of the copolymer is meant the percentage (by weight) of crosslinked material in the copolymer as formed from the polymerisation; this is usually determinable by extraction using a solvent and conditions which dissolves the corresponding uncrosslinked fraction of the copolymer (found e.g. with the aid of a similar copolymer that is known to have been prepared without any possibility for crosslinking) and measuring the weight of the insoluble portion of the copolymer.

To achieve a gel content (as defined) a multi-functional comonomer used (as defined) in the copolymerisation need not—although it can if desired—have at least one of its carbon-carbon double bonds (in the molecule) of significantly lower reactivity than the carbon-carbon double bond(s) of the film-forming comonomer(s) (i.e. it need not be a lower reactivity multi-functional comonomer—although it can be if desired). Thus e.g., it can if desired (although it is not essential) have each double bond bond with the same order of (or even greater) reactivity as the double bond(s) of the film-forming comonomer(s). (Such a multi-functional comonomer is termed hereafter a higher reactivity multi-functional comonomer for convenience).

Hence the same (i.e. a single) multi-functional comonomer in the copolymerisation could be used to provide the gel content (as defined) and the defined residual unsaturation provided it is a lower reactivity type (as discussed above); alternatively there could be used two or more of this lower reactivity type of multi-functional comonomer, or two or more multi-functional comonomers of which one or more is the higher reactivity type and one or more is the lower reactivity type (with preferably only the latter being added in the late part of the polymerisation reaction). Since residual ethylenic unsaturation (for autoxidation) in the resulting copolymer is required, there could not be solely used one or more multi-functional comonomers of the higher reactivity type in the late part of the reaction as this would not result in appropriate residual unsaturation.

The multi-functional comonomer or comonomers should be added (as defined herebefore) in the copolymerisation to achieve the required gel fraction and residual unsaturation of the resulting copolymer.

In order to provide a gel fraction (as hereinbefore defined) in the film-forming copolymer according to the invention, at least one multi-functional comonomer (which, as mentioned before, can be one or more comonomers of the lower reactivity type, or one or more comonomers of the higher reactivity type, or a mixture of one or more higher reactivity comonomers and one or more lower reactivity comonomers) must be added to the copolymerisation reaction in at least an early part thereof; usually, said at least one multi-functional comonomer, at least in part, is added within (i.e. has been added by the end of) the first 70% conversion of monomers to copolymer reached in the copolymerisation (preferably by the end of 60% conversion, often by the end of 50% conversion or by the end of the first 40% conversion reached). This is in order to allow enough of both carbon-carbon double bonds in each molecule to react to yield the required gel fraction. This may be achieved e.g. by the comonomer being fed continuously to the reaction over a large conversion range which includes the early part of the copolymerisation, e.g. by being fed continuously over the conversion range 0 to 95% (or 0 to 90%). Alternatively, at least part of the multi-functional comonomer(s) could be added in one or in a relatively few portions within or during an early part of the copolymerisation, say before the end of the first 70% conversion (or before 60% or 50% conversion). The amount of multi-functional comonomer added in this early part of the copolymerisation is usually at least 5 weight % (preferably 5 to 50 weight % and particularly 5 to 20 weight %) of the total amount of multi-functional comonomer(s) used in the copolymerisation, and the remaining part of the multi-functional comonomer(s) whether it be the same as (particularly in cases where the early fed multi-functional comonomer is of the lower reactivity type) or different chemically to that added initially, added in a later part of the copolymerisation, preferably after at least 70% conversion in the copolymerisation has been reached.

To achieve residual unsaturation in the resulting copolymer (for autoxidative crosslinking purposes) according to the invention, at least one lower reactivity multi-functional comonomer must be added to the copolymerisation reaction in at least a late part thereof; usually said at least one lower reactivity multi-functional comonomer is added at least in part to the copolymerisation reaction after at least 50% and more usually at least 70% conversion has been reached (typically within 50 to 95%, more preferably 70 to 95% conversion). Preferably, at least 20 weight % of any lower reactivity multi-functional comonomer used in the copolymerisation, more preferably at least 50 weight % (particularly 50 to 95 weight %), is added in this later part of the copolymerisation reaction.

The 'early' and 'late' parts of the copolymerisation (in which multi-functional comonomer is added) can correspond to distinct parts of the copolymerisation reaction in terms of the conversion, i.e. the two periods could follow consecutively (as e.g. when a single multi-functional comonomer is continuously fed throughout most of copolymerisation, e.g. over 0 to 90% conversion) or be separated by a gap in conversion (during which no multi-functional comonomer is added)—although the two periods could overlap, particularly where at least one lower reactivity and at least one higher reactivity multi-functional comonomers are being used. Preferably, however, the two periods are separated by a conversion gap (e.g. corresponding to an amount of conversion of at least 5%). We have found that such a procedure may give rise to compositions with improved performance (from the point of view of premature cross-linking to give poor particle coalescence during film-formation) and may also provide more reproducible subsequent autoxidative cross-linking behaviour and hence more reproducible physical properties of the subsequently cross-linked film. We believe that the best system is achieved when the 'early' added multi-functional comonomer gives rise to gel formation, and the 'late' added multi-functional comonomer gives rise to residual unsaturation but no gel formation during the polymerisation. The feeding profiles necessary to achieve these conditions are readily determined by experiment. The presence of a gap between the early and late additions of comonomer assists in achieving this distinction between gel formation and formation of residual unsaturation in the early and late parts of the the copolymerisation, and hence assists in achieving the desired advantages discussed hereinbefore.

As discussed above the multi-functional comonomer(s) may be added as defined to the polymerisation medium either in one portion or in a series of separate portions or by means of a continuous feed of the comonomer. If one or more of the other comonomers (i.e. non-multi-functional and usually film-forming comonomers) is being fed to the polymerisation medium, the multi-functional comonomer may conveniently be fed together with or at the same time as this other comonomer(s).

Examples of suitable multi-functional comonomers for use in the invention include lower reactivity types having at least one autoxidatively reactable double bond provided by an allyl or allyloxy group (or substituted derivative thereof) of formula $CH_2=CRCH_2(O)_x-$ where R and x are as defined before. Examples of such lower reactivity multi-functional comonomers include diallyl esters of aromatic diols such as diallyl phthalate and mono- and diallyl esters of alpha, beta-unsaturated mono- and dicarboxylic acids, such as allyl methacrylate, allyl acrylate, diallyl maleate, diallyl fumarate, and diallyl itaconate; other examples include pentaerythritol triallyl ether, and trimethylol propane diallyl ether. Examples of suitable higher reactivity multi-functional comonomers include 1,3-butylene glycol dimethacrylate, ethylene glycol diacrylate, ethylene glycol dimethacrylate, and divinyl benzene. Our preferred multi-functional comonomers at the present time are diallyl phthalate and allyl methacrylate which can each be used as the sole multi-functional comonomer in the copolymerisation (to achieve both gel and the preferred residual unsaturation) or used in combination.

The film-forming copolymer of the invention preferably contains 1 to 20% by weight of polymerised units derived from multi-functional comonomer. More preferably, the copolymer contains 2 to 10% by weight, and particularly 3 to 8% by weight of polymerised units derived from multi-functional comonomer.

A multi-functional crosslinking material(s), i.e. a material having at least two carbon-carbon double bonds which can take part in an addition crosslinking polymerisation, may also be included with the autoxidation agent(s) in the composition of the invention if desired since this may provide a composition of still further improved cure rate. Such material may be polymeric, oligomeric or monomeric in nature but is usually a monomeric material. It may e.g. be di-, tri-, or tetra-functional (i.e. have 2, 3 or 4 olefinically unsaturated carbon- carbon double bonds). Such a multi-functional cross-linking material (if present in the composition) may be one which has at least one of its at least two carbon-carbon double bonds susceptible to an autoxidation reaction, and examples of such materials include allyl acrylate, allyl crotonate, allyl methacrylate, diallyl fumarate, diallyl maleate, diallyl phthalate, diallyl decanedioate, diallyl octanedioate, trimethyl propane diallyl ether, and diallyl maleate methacrylate. Such a multi-functional crosslinking material (if present) could, however, also be one which does not have any of its at least two carbon-carbon double bonds susceptible to an autoxidation reaction, and examples of such materials include trimethylol propane triacrylate, 1,3-butylene glycol dimethacrylate, ethylene glycol diacrylate, ethylene glycol dimethacrylate, bisphenol-A-dimethacrylate, diethylene glycol dimethacrylate, pentaerythritol triacrylate, pentaerithritol tetraacrylate, triethylene glycol dimethacrylate, trimethylene glycol dimethacrylate, trimethylol propane triacrylate, triethoxylated trimethylol propane triacrylate, tetraethylene glycol diacrylate, ethoxylated bisphenol-A-dimethacrylate and pentaerythritol tetramethacrylate. (It will be noted that the multi-functional comonomer used in the polymerisation and the multi-functional crosslinking material optionally used in the composition may in principle be the same substance; more usually, however, they are different).

If such a crosslinking material(s) is in fact employed in the composition of the invention it is preferably present in an amount of up to 35% by weight, based on the weight (dry) of the film-forming copolymer, and more preferably in amount of 2 to 30% by weight, and particularly 5 to 20% by weight.

The admixture of the copolymer latex with the crosslinking material (if used) may be effected in any suitable order or manner. For example, the crosslinking material (if used) may be stirred into the preformed copolymer latex, allowing sufficient time for the added crosslinking material to equilibrate in the composition (it will tend to swell the copolymer); this leads to a more homogeneous composition with better film-forming properties.

The compositions of the invention may if desired by treated with alkali or acid to achieve any desired pH therefor.

The film-forming copolymer is preferably a polymer comprising units derived from (in addition to those of the multi-functional comonomer(s) discussed above) one or more monoethylenically unsaturated monomers of the film-forming type containing one or more (but more preferably one) olefinic, vinyl, or vinylidene groups, or groups containing acrylic or methacrylic double bonds.

The copolymers which may be used as the film-forming copolymer in the present invention include copolymers of one or more of the following:
vinyl chloride,
vinylidene chloride,
vinyl esters of alkanoic acids having from 1 to 18 carbon atoms in the alkyl group, especially vinyl acetate,
alkyl acrylates and methacrylates having from 1 to 18 carbon atoms in the alkyl group,
vinyl ethers,
acrylamide and substituted acrylamides,
acrylonitrile, and methacrylonitrile,
monoethylenically unsaturated hydrocarbons, for example ethylene, isobutene, styrene and alpha-methyl styrene.

The copolymers must all, of course, include polymerised units derived from at least one multi-functional comonomer (as discussed above).

The copolymers may also (optionally but sometimes preferably) have an acid functionality, usually by virtue of containing polymerised units of a proportion of one or more aliphatic alpha-beta unsaturated carboxylic acids or ethylenically unsaturated phosphorous or sulphur-containing acids (such as a sulphonic acid like 2-acrylamide-2-methyl proprane sulphonic acid). The proportion of such acid(s) may be, for example, from 0.2 parts to 10 weight % based on the (dry) weight of the copolymer. Acids which may be used include acrylic, methacrylic, itaconic and citraconic acids.

The copolymer of the composition may e.g. be a copolymer of vinyl chloride, vinylidene chloride, one or more alkyl acrylates or alkyl methacrylates having from 1 to 12 carbon atoms in the alkyl group, and at least one multi-functional comonomer (as defined); such polymers may optionally also contain polymerised units of one or more aliphatic alpha-beta unsaturated carboxylic acids. Examples of such copolymers, minus the inclusion of multi-functional comonomer, are those described generally and specifically in the specifications of our UK Pat. No. 1 558 411 and our European Pat. No 30080. The copolymer may advantageously also e.g. be an acrylic ester or methacrylic ester copolymer (i.e. copolymers mainly centred on acrylic or methacrylic esters as the film-forming comonomer(s)).

The addition copolymerisation to form the film-forming copolymer of the present invention may be carried out by well-established techniques, e.g. by emulsion copolymerisation in an aqueous medium with the aid of a free-radical-yielding initiator and usually in the presence of a surface-active agent, which will yield an aqueous latex of the copolymer. The copolymer solids content of the latex is typically 30 to 70% w/w (more usually 40 to 65% w/w).

In the composition of the invention, a single drier salt may be employed, or (as is often more preferred) two or more drier salts may be used in admixture with one another. Drier salts are normally employed by dissolving them in water-immiscible organic solvents (and in fact drier salts are usually supplied commercially as solutions in water miscible organic solvents) and then emulsifying the solution of the drier salt(s) into water (or into the copolymer emulsion) with the aid of surfactants which while broadly of any character, are preferably nonionic surfactants to minimize disturbing the unsaturation present, and to minimise the introduction of water sensitivity into the final cured film. The aqueous emulsion of drier salt(s) (which is usually prepared separately) is then mixed into the latex emulsion. Pigment suspensions can be mixed in as desired, as is customary in the provision of emulsion paints, without disturbing the cure capacity of the emulsion after it has been filmed upon a substrate and allowed to air dry. The drier emulsion can be added to the copolymer emulsion before or after pigmentation.

Appropriate organic solvents which are essentially insoluble in water are illustrated by mineral spirits (e.g. white spirit) which is preferred, and by xylene and hexoxy ethanol. Total insolubility in water is not required to enable emulsification in water.

It is also possible to employ water-soluble drier salts without the need to use an organic solvent.

Alternatively chelated, water-dispersible drier salts may be employed (as mentioned supra).

The composition of the invention may also include various other ingredients. For example, it may if desired include ingredients commonly employed in film-forming coating formulations, such as defoamers, rheology control agents, thickeners, dispersing and stabilizing agents (usually surfactants), wetting agents, extenders, fungicides, coalescing solvents, plasticisers, anti-freeze agents, and particularly pigments, (as discussed above). The composition of the invention may also if desired contain one or more other types of polymer (i.e. polymer other than as defined above for the gel-containing addition copolymer) incorporated preformed into the composition, e.g. by adding an emulsion of such a polymer to the already-formed composition or, more preferably, by performing the polymerisation to form said gel-containing copolymer of the invention (as defined) in the presence of an emulsion of such a polymer. Preferably, such an other type of polymer (if used) is a condensation polymer; examples of such condensation polymers include polyurethanes, epoxy polymers and polyesters.

The compositions of the present invention may be used to coat a variety of substrates (often in the form of sheeting). Such substrates include wood, paper, cardboard, various forms of panelling such as plyboard, particleboard, plasterboard, various plastics materials, various minerals such as glass, asbestos, carbon fibre, concrete, plaster and ceramics, and in particular metals such as iron, steel and aluminium. The compositions may be applied by conventional techniques for the application of a coating to a substrate, for example by brush, spray, roller, or dipping.

The cross-linked films are normally formed from the compositions by application of the compositions to a substrate, removing the water phase by ambient temperature air-drying (to form a film coating), and allowing the film coating to autoxidatively cure by exposure to the surrounding air at ambient temperature for an appropriately long period of time in order to develop an adequate degree of cure and hence desirably improved properties. Such a period may vary from a few hours to several days or even to a month or more.

The present invention is now illustrated by the following examples; the prefix C before an example denotes a comparative example. Unless otherwise specified all parts, percentages and ratios are on a weight basis.

The key to the monomer notation used in the examples is as follows:

| | |
|---|---|
| VDC | vinylidene chloride |
| VC | vinyl chloride |
| EHA | 2-ethylhexyl acrylate |
| MAA | methacrylic acid |
| AM | allyl methacrylate |
| DAP | diallyl phthalate |

EXAMPLES C1, C2 AND 3

Compositions not according to the invention (Example C1 and C2) and a composition according to the invention (Example 3) were prepared using aqueous latices of copolymers (made using aqueous addition polymerisations) having the following compositions:

| | | |
|---|---|---|
| Ex. C1: | VDC/VC/EHA/MAA | 71.3/20.4/6.3/2.0 |
| Ex. C2 | VDC/VC/EHA/DAP | 71.3/20.4/6.3/2.0/5.0 |
| Ex. 3: | VDC/VC/EHA/MAA/AM/ DAP | 71.3/20.4/6.3/2.0/0.5/ 5.0 |

In the preparation of the copolymer used for Example 3, the AM employed was incorporated within the first 50% conversion to provide a polymer gel content of ca. 60% while the DAP employed was added within the conversion range 70 to 90% to provide residual unsaturation for autoxidation purposes. In the preparation of the copolymer used for Example C2, the DAP employed was added within the conversion range 70 to 90% to provide residual unsaturation; however there was no early-fed AM as in the copolymer used for Example 3 (i.e. no early-formed gel). The copolymer used for Example C1 of course contained neither gel nor residual unsaturation.

C1 has neither gel nor residual unsaturation; the copolymer of Example C2 does have late-formed residual unsaturation but has no early-formed crosslinking, and although crosslinking occurs with the addition of drier salt, as evidenced by an increase in % gel with dry time, tensile properties and solvent resistance do not improve to any significant extent).

| Composition Used | Dry Time (days) | Gel Content of polymer after drying % | Tensile Properties (at 20° C.) | | Solvent Resist. (No. of MEK double rubs) |
|---|---|---|---|---|---|
| | | | Initial Modulus Ncm$^{-2}$ | Elongation to Break % | |
| Ex. C1 | 2 | 0 | 1471 | 686 | 7 |
| | 29 | 0 | 1603 | 620 | 8 |
| Ex. C2 | 0 | 0 | ca 2270$^a$ | 470$^a$ | nm |
| | 2 | nm | 2550 | 359 | 36 |
| | 29 | 40 | 2805 | 307 | 10 |
| Ex. 3 | 0 | 61 | ca 2500$^a$ | 288$^a$ | 174$^{b,c}$ |
| | 3 | nm | 5178 | 173 | 233$^b$ |
| | 29 | 83.5 | 8938 | 137 | 350$^b$ |

$^a$measurement estimated from the effect of white spirit emulsion on the latex without any drier salt included.
$^b$composition also contained 0.05% w/w Ca for these MEK rub tests.
$^c$dry time 1 day for this MEK rub test.
nm: not measured.

The latices of these copolymers were used to form compositions corresponding to Examples C1, C2 and 3 by admixture with drier salt autoxidation catalysts based on Co and Zr to give 0.05% of Co and 0.05% of Zr, both based on the weight of solid copolymer. The drier salts, supplied as solutions in white spirit, were separately emulsified in Water, using a non-ionic surfactant, before being mixed at low speed with the copolymer latex. (Variations on this composition were used for some measurements as indicated in the following table of results).

Films were prepared from the compositions of Examples C1, C2 and 3 and tested for solvent resistance, initial modulus and elongation to break after having been allowed to dry for various periods of time under ambient conditions (see following table of results).

The films used for the tensile and gel content measurements were prepared by casting the appropriately thickened compositions on 6×4 inch glass panels using a 100 micron bar applicator to give dry film thicknesses of about 30 microns. The tensile measurements, performed at 20° C., were carried out on standard test pieces (2.2 cm×0.5 cm) punched from the peeled film.

The films used for the solvent resistance measurements were prepared by casting the compositions on 6×4 inch metal "Q panels" with a No 8 Mayer bar to give dry film thicknesses of about 50 microns. Solvent resistance for a film was assessed by rubbing the film with a rag soaked in methyl ethyl ketone (MEK) until the substrate was showing through, the result quoted being the number of double rubs to effect this.

The results of testing are shown in the following table.

The advantageous improvement in properties achieved by autoxidative cross-linking of the composition according to the invention is readily apparent from these results. Thus comparison of Example 3 with Examples C1 and C2 shows the importance of having copolymers with both residual unsaturation formed by late-addition of lower reactivity multi-functional comonomer and early-formed gel (the copolymer of Example

EXAMPLE 4

A composition according to the invention was prepared in this example using an aqueous latex of a copolymer (made using aqueous addition polymerisation) having the following composition:

| VDC/VC/EHA/MAA/AM/DAP | 71.3/20.4/6.3/2.9/0.5/5.0 |
|---|---|

In the preparation of this copolymer, the AM used was incorporated within the first 5 to 50% conversion to provide a polymer gel content of ca. 74% while the DAP employed was added within the conversion range 70 to 90% to provide residual unsaturation for autoxidation purposes. The multi-functional material triethoxylated trimethylol propane triacrylate (TTPT) was emulsified with 5% w/w "Synperonic" NP 30 (20% w/w aqueous solution) and distilled water to give a 50% w/w solids emulsion. A portion of this emulsion was mixed with the latex copolymer to give 10% w/w TTPT on copolymer solids. The latex composition was then mixed with drier salt oxidation catalysts as in the previous examples to give 0.05% Co and 0.05% Zr on polymer solids, thereby forming the composition of this example.

Films were prepared and tested for solvent resistance as before after drying for various periods of time under ambient conditions. In cases where the MEK double rub resistance was >>500, MEK spot tests were performed: a glass cylinder (ca. 3 cm diameter) is placed upright on the film and sealed with grease; the cylinder is then filled with MEK and allowed to stand for 15 minutes; it is then removed, and the film patted dry; the area of film in contact with MEK is then assessed out of 10 (0/10—poor, no film left; 10/10—excellent, cannot see where MEK has been).

The follow results were obtained.

| Dry Time (days) | Solvent Resistance | |
|---|---|---|
| | No. MEK double rubs | MEK spot test |
| 1 | 290 | nm |
| 3 | 516 | nm |
| 7 | >>500 | 8/10 |
| 10 | >>500 | 8/10 |

The further advantage of including a multi-functional crosslinking material in the composition is thus apparent.

We claim:

1. An aqueous-based, film-forming and ambient-temperature autoxidisably crosslinkable coating composition comprising an aqueous latex of at least one film-forming and ambient-temperature autoxidisably crosslinkable copolymer formed by free-radical initiated addition polymerization of a monomer system comprising at least one ethylenically unsaturated comonomer providing when polymerized the basis of the film-formability of said film-forming compolymer, hereinafter to be termed the at least one "film-forming comonomer", and an autoxidation catalyst(s) incorporated into said composition for effecting ambient temperature autoxidaton of said at least one copolymer after application of the coating composition as a coating layer, wherein said film-forming copolymer has a gel fraction of at least 5% by weight which has been formed from the monomer system used to prepare said film-forming copolymer as a result of the inclusion therein of at least one multi-functional comonomer which has been added to the copolymerization reaction in at least an early part thereof, said early part being within the first 70% conversion reached in the copolymerization, and wherein said at least one film-forming addition copolymer is autoxidisably crosslinkable, having residual carbon-carbon double bond unsaturation therein susceptible to an autoxidation reaction, as a result of said monomer system including at least one lower reactivity multi-functional comonomer which has at least two unsaturated carbon-carbon double bonds which can each take part in a free-radical initiated copolymerization reaction and at least one which reacts at a significant slower rate that does the unsaturated bond(s) of said at least one film-forming comononer and is susceptible to an autoxidative crosslinking reaction in a subsequently formed film coating, which lower reactivity multi-functional comomoner has been added to the copolymerization reaction in at least a late part thereof, said late part being after 70% conversion in the copolymerization has been reached.

2. A composition according to claim 1 wherein said autoxidation catalyst(s) is a drier salt or a mixture of two or more drier salts.

3. A composition according to either claim 1 wherein the gel fraction of said at least one film forming copolymer of the composition is 20 to 90% by weight.

4. A composition according to claim 1 wherein said at least one lower reactivity multi-functional comonomer used in the preparation of said at least one film-forming copolymer of the composition is selected from multi-functional comonomers having one or more groups of formula $CH_2=CRCH_2(O)_x-$ where R is hydrogen or a lower (C1 to C4) alkyl group and x is 0 to 1.

5. A composition according to claim 1 wherein said late part is within 70 to 95% conversion reached in the copolymerization.

6. A composition according to claim 1 wherein in the copolymerisation to form said at least one film-forming polymer of the composition there is a gap between said early and late parts of the copolymerisation in which no multi-functional comonomer is added.

7. A composition according to claim 1 wherein said film-forming copolymer of the composition comprises 1 to 20 weight % of polymerised units derived from multi-functional comonomer.

8. A composition according to claim 1 wherein said at least one film-forming comonomer comprises at least one monoethylenically unsaturated monomer containing at least one group selected from olefinic, vinyl, and vinylidene groups, and groups containing acrylic or methacrylic double bonds.

9. A composition according to claim 8 wherein said at least one film-forming copolymer of the composition is a copolymer comprising (in addition to units of multi-functional comonomer) units of one or more of the following:
vinyl chloride,
vinylidene chloride,
vinyl esters of alkanoic acids having from 1 to 18 carbon atoms in the alkyl group,
alkyl acrylates and methacrylates having from 1 to 18 carbon atoms in the alkyl group,
vinyl ethers,
acrylamide and substituted acrylamides,
acrylonitrile, and methacrylonitrile, and
monoethylenically unsaturated hydrocarbons.

10. A composition according to claim 1 wherein said at least one film-forming copolymer of the composition comprises units of at least one $\alpha,\beta$-unsaturated carboxylic acid.

11. A composition according to claim 1 wherein said at least one film-forming copolymer of the composition is a copolymer comprising units of vinyl chloride, vinylidene chloride, one or more alkyl acrylates or alkyl methacrylates having from 1 to 12 carbon atoms in the alkyl group, at least one lower multi-functional comonomer reactivity and optionally at least one aliphatic $\alpha,\beta$-unsaturated carboxylic acid.

12. A composition according to claim 1 which composition additionally includes at least one multi-functional crosslinking material which has at least one of its at least two carbon-carbon double bonds susceptible to an autoxidation reaction.

13. A composition according to claim 1 which composition additionally includes at least one multi-functional crosslinking material which does not have any of its at least two carbon-carbon double bonds susceptible to an autoxidation reaction.

* * * * *